United States Patent [19]
Miller et al.

[11] Patent Number: 5,173,900
[45] Date of Patent: Dec. 22, 1992

[54] METHOD AND APPARATUS FOR COMMUNICATING DIFFERENT CATEGORIES OF DATA IN A SINGLE DATA STREAM

[75] Inventors: Michael R. Miller, Riverton, N.J.; Marc W. Kauffman, Cheltenham; Clyde Robbins, Maple Glen, both of Pa.

[73] Assignee: General Instrument Corporation, Hatboro, Pa.

[21] Appl. No.: 703,113

[22] Filed: May 17, 1991

[51] Int. Cl.[5] .............................................. H04J 3/26
[52] U.S. Cl. ................................. 370/110.1; 370/94.1; 370/99; 380/20
[58] Field of Search ................... 370/110.1, 94.1, 99; 380/13, 15, 19, 20, 21, 9, 10

[56] References Cited

U.S. PATENT DOCUMENTS

| | | | |
|---|---|---|---|
| 3,743,767 | 7/1973 | Bitzer et al. | 370/99 |
| 4,323,922 | 4/1982 | den Toonder et al. | 380/15 |
| 4,390,986 | 6/1983 | Moses | 370/99 |
| 4,613,901 | 9/1986 | Gilhousen et al. | 380/21 |
| 4,712,239 | 12/1987 | Frezza et al. | 380/13 |
| 4,920,566 | 4/1990 | Robbins et al. | 380/19 |
| 4,953,208 | 8/1990 | Ideno | 380/15 |

Primary Examiner—Douglas W. Olms
Assistant Examiner—Min Jung
Attorney, Agent, or Firm—Barry R. Lipsitz

[57] ABSTRACT

A system for transmitting different categories of data in a single data stream generates program data, receiver control data, and program specific tag data for insertion into a single data stream. Program data is combined with receiver control data to form data groups. Headers are generated containing tag data. Each successive header is combined with a plurality of data groups to form a plurality of units. The data stream is constructed by joining successive units for transmission. A receiver for receiving the data stream detects the receiver control data and the tag data, and recovers the program data in response thereto. A program is reproduced from the recovered program data. The system runs off a master clock having a fixed frequency. Program data is sampled at a first rate that is a function of the master clock frequency. The receiver control data is sampled at a second rate that is a function of the first sampling rate. The tag data is sampled at a third rate that is a function of the second sampling rate. Preferably, the first sampling rate will be an integer factor of the master clock frequency, the second sampling rate will be an integer factor of the first rate and the third sampling rate will be an integer factor of the second rate.

26 Claims, 4 Drawing Sheets

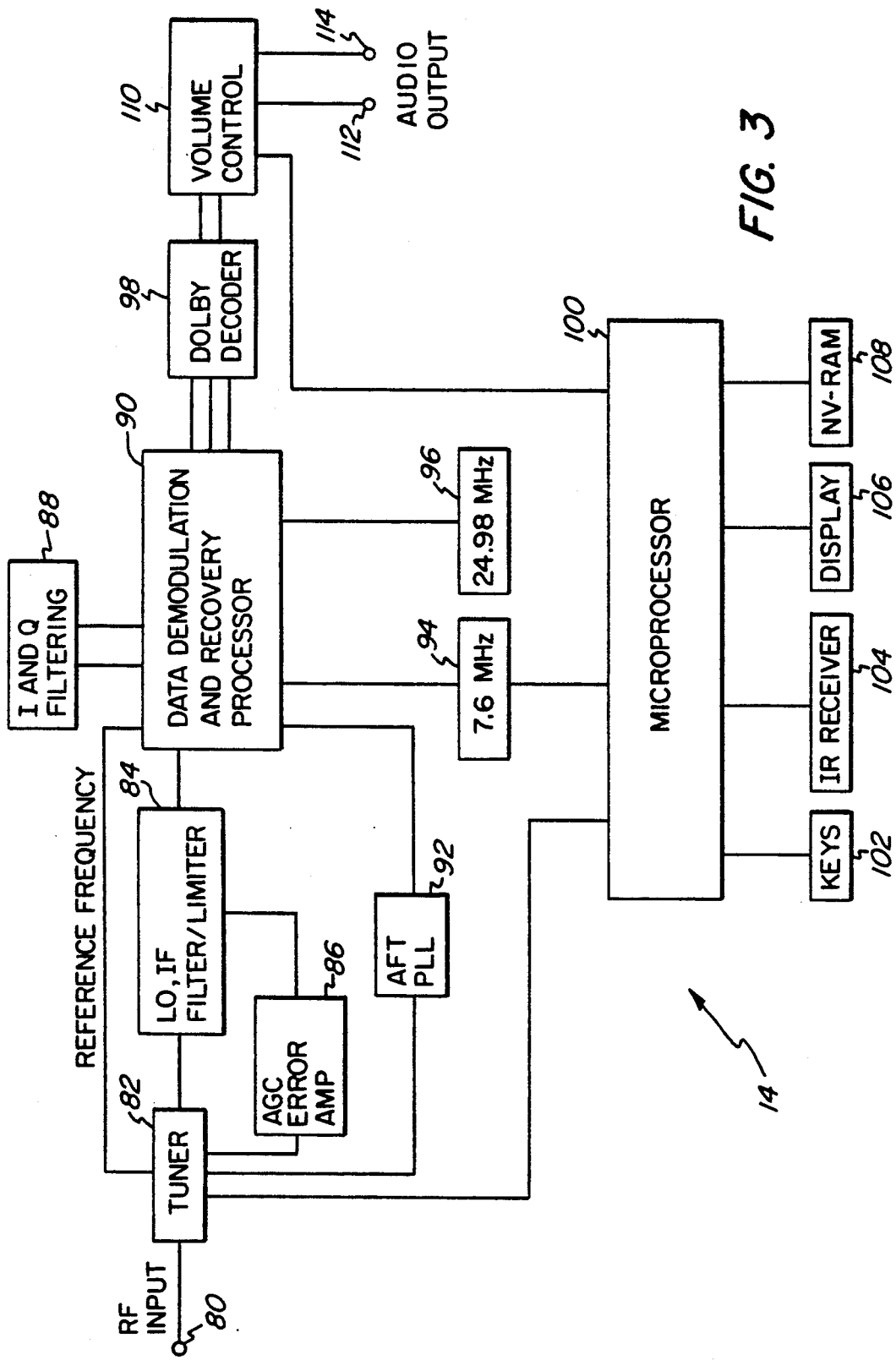

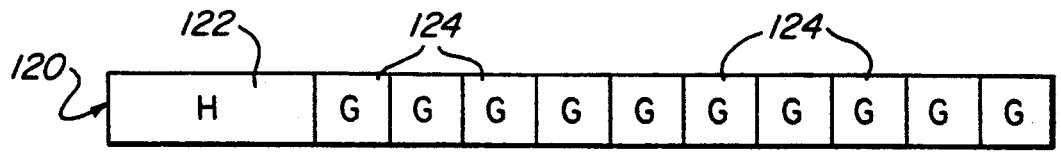
FIG. 4 UNIT FORMAT
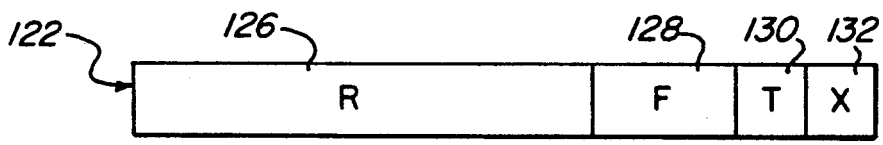
FIG. 5 HEADER FORMAT
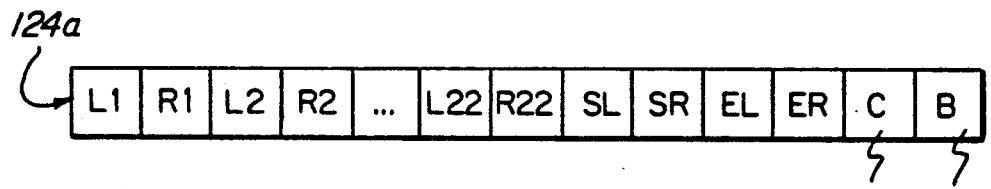
FIG. 6 NORMAL STEREO GROUP FORMAT
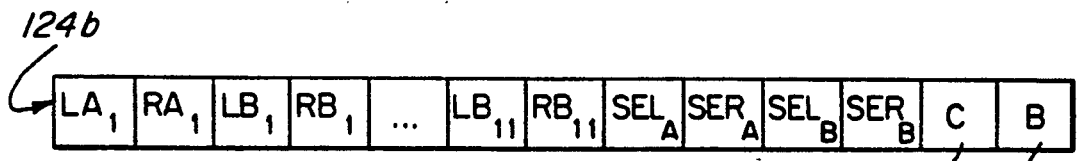
FIG. 7 LSR GROUP FORMAT
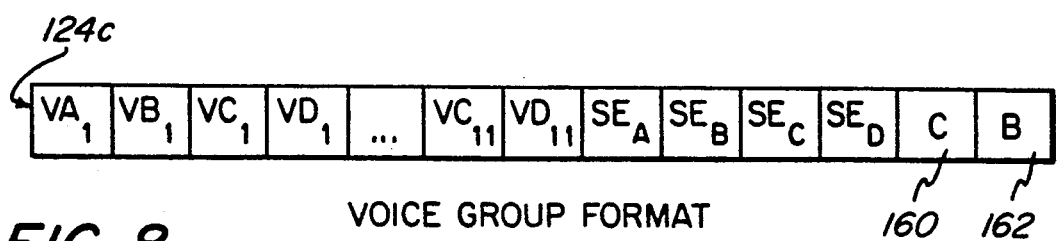
FIG. 8 VOICE GROUP FORMAT

METHOD AND APPARATUS FOR COMMUNICATING DIFFERENT CATEGORIES OF DATA IN A SINGLE DATA STREAM

BACKGROUND OF THE INVENTION

The present invention relates to the communication of digital data, and more particularly to a system for communicating program data over a cable television network or the like together with program specific tag data and nonprogram specific receiver control data. The invention has particular applicability to the communication of high quality digital audio signals via a cable television system.

Cable television ("CATV") networks can carry various types of information. Television programs comprise the bulk of the information currently carried via CATV systems. Such information has generally been carried in an analog form, modulated on a radio frequency ("RF") signal for recovery and reproduction by a subscriber's television receiver.

Cable television growth has come from the development of various programming categories and by the technologies that have made program delivery possible. Cable first brought distant television signals to areas where there was little or no off-air reception. This applies to distant signals and weak signal areas where outdoor antennas were previously mandatory. The next category to bring major growth to cable was pay service after the development of reasonable cost satellite delivery systems. Such services require a subscriber to pay a monthly service fee to the cable system operator in order to receive a desired level of basic and optional premium programming. Recently, addressable technology and aggressive marketing have enabled "pay-per-view" programming to proliferate.

The transmission of digital data via a cable television network is also possible. Recent developments in this area include the provision of high quality digital audio services over cable. In the past, the signal quality of analog audio transmission techniques has been poor and there has been no efficient way to collect revenue or control access to such services. With digital techniques, access to premium audio programming can be controlled so that only authorized subscribers can recover and reproduce the audio data. Digital audio broadcasts provide reproduction of music that is extremely realistic and absent from background noise and distortions that have plagued other high fidelity sound systems in wide scale use.

An example of high fidelity sound reproduction using digital techniques can be found in the compact disc technology that has enjoyed tremendous success as an alternative to phonograph records and tapes. Digital techniques for the communication of high fidelity audio programs via a CATV network as well as via direct broadcast satellite and over the air enable the provision of high quality audio services on a subscription basis. Commonly owned U.S. patent application Ser. No. 07/280,770 filed Dec. 6, 1988 for "Apparatus and Method for Providing Digital Audio in the FM Broadcast Band", incorporated herein by reference, discloses a method and apparatus for providing high quality digital sound signals within the FM broadcast band. Commonly owned U.S. Pat. No. 4,821,097 to C. Robbins entitled "Apparatus and Method for Providing Digital Audio on the Sound Carrier of a Standard Television Signal", also incorporated herein by reference, discloses a system wherein the FM audio portion of a standard television signal is replaced with digital audio.

In the techniques disclosed in the above-mentioned references, the digital audio information is carried using multilevel (e.g., multiphase) modulation. A well known type of multiphase modulation is quadrature phase shift keyed ("QPSK") modulation. Advantages of QPSK modulation are discussed in C. Robbins, "Digital Audio for Cable Television", 1986 *NCTA Technical Papers*, Dallas, Tex., Mar. 15-18, 1986, pp. 21-24.

In a QPSK transmission, an in-phase component I and an out-of-phase component Q (typically, 90° out of phase with the I component) are provided. The I and Q components are processed in a well known manner to recover the original digital data that was used to modulate the QPSK signal. In the past, the I and Q components have been detected from the transmitted signal on which they are carried using a phase reference derived independently of the modulated data carrier. An example of such a demodulator is provided in FIG. 6 of the above-mentioned U.S. Pat. No. 4,821,097.

In order to control access to program data carried on a cable television or satellite television system, the data is encrypted as described, for example, in U.S. Pat. No. 4,613,901 entitled "Signal Encryption and Distribution System for Controlling Scrambling and Selective Remote Descrambling of Television Signals" to Gilhousen, et al, and U.S. Pat. No. 4,563,702 entitled "Video Signal Scrambling and Descrambling Systems" to Heller, et al. These systems provide for digital stereo audio transmission in the horizontal blanking interval of a National Television Standards Committee ("NTSC") television signal. Other, less sophisticated scrambling systems for the video portions of television signals are well known.

The encryption of digital data for transmission via a subscription television network requires the insertion of various cryptographic key information and control data within a data stream carrying the program data. Some of the data, commonly referred to as "tag data" is specific to a particular program being communicated. Other data, sometimes referred to as "addressable control data" or "receiver control data" is not specific to any particular program, but may be specific to a particular addressable subscriber terminal, such as a set top converter coupled between the incoming cable and the subscriber's television set.

In the case of digital audio data, which is advantageously encoded using the Dolby® adaptive delta modulation ("ADM") encoding system, the digital audio data must also be accompanied by step data and emphasis data necessary to reproduce the original audio program. The integration of these various categories of data (i.e., tag data, receiver control data, encryption data, step data and emphasis data) for transmission is a complicated engineering problem that can impact the ultimate cost of the communication system components.

It would be advantageous to provide a system for communicating different categories of digital data in a single data stream. Since any communication system will consist of only a few transmitters but literally millions of receivers, it would be further advantageous to configure the data stream format such that the data can be recovered using receivers that are relatively inexpensive to manufacture and install. The present invention provides a system and receiver apparatus enjoying the aforementioned advantages.

SUMMARY OF THE INVENTION

In accordance with the present invention, a method is provided for transmitting different categories of data in a single data stream. Program data is generated for insertion into the data stream. A first category of control data, which can comprise nonprogram specific receiver control data, is generated for insertion into the data stream. A second category of control data, which can comprise program specific tag data, is generated for insertion into the data stream. A set of the program data is combined with a set of the first category of control data to form a data group. A header is generated containing data from the second category of control data, and combined with a plurality of the data groups to form a unit. The data stream is constructed by joining a plurality of successive units for transmission.

When the second category of control data comprises program specific tag data, the tag data can identify the format of the data in the data groups. For purposes of the present disclosure, the format of the data includes its frequency and location within a data group.

In an illustrated embodiment, a master clock is provided having a fixed frequency. The program data is sampled for incorporation into the data stream at a first rate that is a function of the master clock frequency. The first category of control data is sampled for incorporation into said data stream at a second rate that is a function of the first sampling rate. The second category of control data is sampled for incorporation into the data stream at a third rate that is a function of the second sampling rate. In a preferred embodiment, the first rate is an integer factor of the master clock frequency, the second rate is an integer factor of the first rate, and the third rate is an integer factor of the second rate.

Apparatus is provided in accordance with the present invention for communicating different categories of digital data to a receiver. First means generate a first category of control data for insertion into a data stream. Second means generate a second category of control data for insertion into the data stream. Third means generate program data for insertion into the data stream. Means operatively associated with the first and third means combine a set of the program data with a set of the first category of control data to form a data group. Means operatively associated with the second means generate a header containing data from the second category of control data. Means are provided for combining the header with a plurality of the data groups to form a unit. The data stream is constructed by joining a plurality of successive units for transmission. In an illustrated embodiment, the second means generate program specific tag data, and the first means generate nonprogram specific receiver control data. The tag data can identify the format of the data in the groups.

The apparatus can further comprise a master clock having a fixed frequency. The program data is sampled at a first rate that is a function of the master clock frequency for incorporation into the data stream. The first category of control data is sampled at a second rate that is a function of the first sampling rate for incorporation into the data stream. The second category of control data is sampled at a third rate that is a function of the second sampling rate for incorporation into the data stream. In order to simplify the design of the apparatus, the first rate is preferably an integer factor of the master clock frequency, the second rate is preferably an integer factor of the first rate, and the third rate is preferably an integer factor of the second rate.

A receiver is provided for receiving the data stream from the aforementioned apparatus. The receiver includes means for detecting the first and second categories of control data from the received data stream. Means responsive to the detected control data recover program data from the received data stream. Means are provided for reproducing a program from the recovered program data.

In order to recover the data, the receiver includes a master clock having a fixed frequency. The recovering means sample the program data at a first rate that is a function of the master clock frequency. The detecting means sample the first category of control data at a second rate that is a function of the first sampling rate. The detecting means sample the second category of control data at a third rate that is a function of the second sampling rate. As with the transmitter, in the receiver of the present invention it is preferable that the first rate be an integer factor of the master clock frequency, the second rate be an integer factor of the first rate, and the third rate be an integer factor of the second rate. In an illustrated embodiment, the program data is digital audio data used to reproduce an audio program.

A digital data receiver is provided for receiving a data stream containing successive headers including tag data, with each header followed by a plurality of data groups including program data and receiver control data. The receiver includes first means for detecting receiver control data from successive data groups contained in a received data stream. Second means detect tag data from successive headers contained in the received data stream. Means responsive to the detected tag and receiver control data recover program data from the received data stream. The recovered program data is used to reproduce a program.

The data receiver further comprises a master clock having a fixed frequency. The recovering means sample the program data at a first rate that is a function of the master clock frequency. The first detecting means sample the receiver control data at a second rate that is a function of the first sampling rate. The second detecting means sample the tag data at a third rate that is a function of the second sampling rate. Preferably, the first rate is an integer factor of the master clock frequency, the second rate is an integer factor of the first rate and the third rate is an integer factor of the second rate. In an illustrated embodiment, the program data is digital audio data used to reproduce an audio program. In order to simplify the design of the data receiver, it is advantageous for the master clock to run at a rate that provides an integer number of cycles per bit of data in the data stream.

The data receiver can also include means for tuning to different channels to receive different data streams having different data groups that may be provided in different formats. In such an embodiment, the tag data can contain information identifying the data group format for a particular channel for use by the program data recovering means in recovering program data from that channel.

BRIEF DESCRIPTION OF THE DRAWINGS

FIG. 3 is a detailed block diagram of a subscriber terminal used in the communication system of FIG. 1;

FIG. 4 is a diagram illustrating a data unit format in accordance with the present invention;

FIG. 5 is a diagram illustrating a header format in accordance with the present invention;

FIG. 6 is a diagram illustrating one version of a data group format in accordance with the present invention;

FIG. 7 is a diagram illustrating a second format for a data group in accordance with the present invention; and FIG. 8 is a diagram illustrating a third format for a data group in accordance with the present invention.

DETAILED DESCRIPTION OF THE INVENTION

The present invention provides a method and apparatus for communicating different categories of data in a single data stream. The invention is described herein in accordance with a specific application in which digital audio signals are transmitted via a CATV system. It should be appreciated that the invention is also applicable to the transmission of other types of data and the use of other communication networks.

Figure 1:
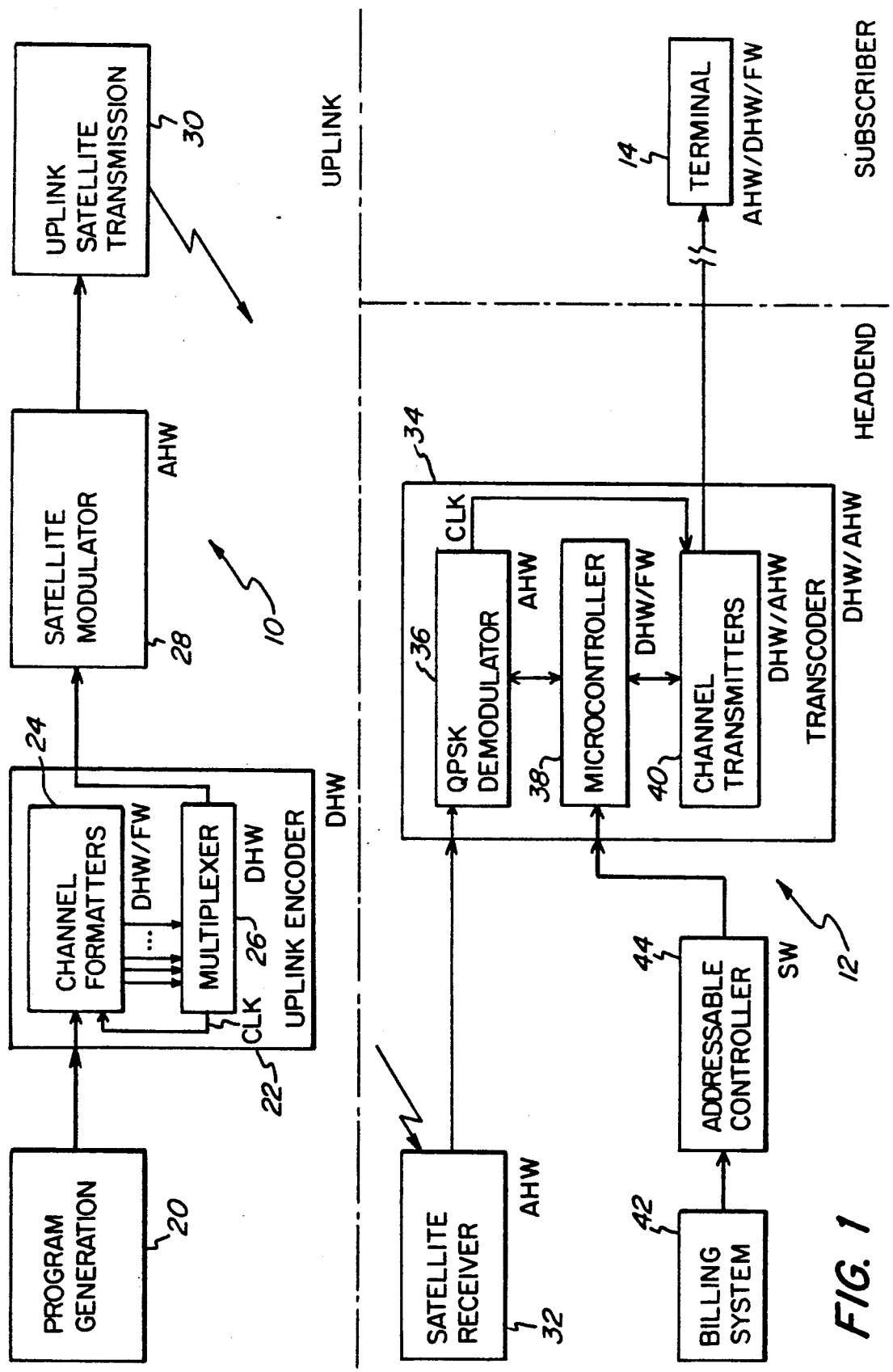
FIG. 1 is an overall system block diagram of a data communication system in accordance with the present invention.

FIG. 1 is a general block diagram of a system in accordance with the present invention. In the figure, various abbreviations are used. The abbreviation "AHW" refers to analog hardware. "DHW" refers to digital hardware. "FW" is used to designate firmware, and "SW" to designate software. In the embodiment illustrated, digital audio signals are generated and transmitted via a satellite uplink to a satellite receiver utilized by a cable television system operator. The received data is processed at the cable operator's headend, and transmitted to subscribers via the cable television network.

At the satellite uplink facility, generally designated 10 in FIG. 1, digital audio programming is created by an automated program generation subsystem 20. Equipment for programming a succession of digital audio selections is commercially available, e.g., from Media Touch Systems, Inc. of Dallas, Tex.

For each of a plurality of channels of digital audio, program generation subsystem 20 provides a pair of compact disc players, a summing amplifier/fader, an audio switcher, a Dolby ® adaptive delta modulation digitizing encoder, and a play list control computer. Each of the individual channel control computers is networked to a central file server computer that controls the distribution of audio programming play lists to the individual channel control computers. In a preferred embodiment, the central file server computer is remotely accessible via telephone lines to download master play list information.

Equipment is also provided to detect channel outages, and to monitor individual audio channel quality. Redundancy is provided in the program generation subsystem to enable continuous audio programming on each channel. By providing a pair of CD players with a summing amplifier/fader, a new song or musical composition can be broadcast immediately at the termination of a prior one to achieve the objective of continuous music on each audio channel. Those skilled in the art will appreciate that digital audio tape players or other digital storage devices can be substituted or used in combination with CD players to provide digital music programming.

The digitized audio output for each program channel is fed to an uplink encoder 22. Using current technology, up to 28 separate audio channels can be supported per satellite transponder. Uplink encoder 22 includes a channel formatter for each CD quality channel. The channel formatter encrypts the audio data, formats the data to allow for addressable control and program-specific tagging data insertion, generates and inserts the tagging data, and inserts error correcting data. The separate formatted channels are then time division multiplexed together by a multiplexer 26 contained in uplink encoder 22. Multiplexer 26 also inserts a satellite run-in code, which when combined with the time division multiplexed ("TDM") audio data provides a digital baseband input for a satellite modulator 28.

Satellite modulator 28 modulates the digital baseband data onto a carrier, e.g., at 70 MHz, for output to uplink satellite transmission equipment 30. The 70 MHz intermediate frequency ("IF") signal output from satellite modulator 28 is upconverted and transmitted in an appropriate satellite transmission band by transmitter 30. The uplink satellite transmission equipment 30 is commercially available, e.g., from Hughes Aircraft Co., Microwave Products Division, Torrance, Calif.

In the illustrated embodiment, the satellite modulator uses an offset-keyed quadrature phase shift keying ("OK-QPSK") modulation technique that modulates the parallel bit streams into a 70 MHz carrier frequency. In this manner, four distinct phase states of the modulated signal are provided, corresponding to the four possible bit pairs ("dibits") from the parallel bit streams. The offset-keying delays one of the parallel bit streams by one-half of a bit time, so that transitions on the two streams never occur simultaneously. The result is that only 90° phase transitions occur. After filtering the input signals, the effect is that the overall signal has a minimally varying envelope amplitude, advantageous for spectrum containment in nonlinear systems.

The satellite signal transmitted from the uplink is received by one or more cable television system operators at a satellite receiver 32. This component recovers the transmitted data at the 70 MHz IF frequency, and outputs it to a transcoder 34 at the cable system headend, generally designated 12. Transcoder 34 includes a QPSK demodulator 36, microcontroller 38, and a channel transmitter 40 (one shown) for each audio program channel.

QPSK demodulator 36 demodulates the received data, and sends the recovered data to microcontroller 38 at a relatively high processing speed (e.g., 14.6 MHz). Microcontroller 38 contains a microprocessor, programmable logic, and firmware. One function of microcontroller 38, and specifically the programmable logic thereof, is to search for the satellite run-in code and lock on to the received signal. Microcontroller 38 also receives addressable receiver control data from an addressable controller 44 located at headend 12.

Addressable controller 44 provides locally generated data for insertion into the composite bit stream for each audio program channel. The addressable control data channel is provided by a biphase (Manchester encoded) source, such as an ARC-1000 or AH Series Addressable Controller available from the Jerrold Communications Division of General Instrument Corporation, Hatboro, Pa. As is well known in the art, such headend data includes authorizations for specific subscribers to receive specific programs to which they subscribe. The addressable control data is one category of data transmitted to the subscriber in a single data stream in accordance with the present invention. As noted above, program specific tag data and the actual audio program data are other categories of data transmitted to subscribers in the single data stream.

The control data, high speed program data, and synchronization information provided by microcontroller 38 are sent to a channel transmitter 40 for each program channel. Each channel transmitter 40 demultiplexes the high speed data stream from microcontroller 38 to recover the digital data for the transmitter's program channel. The transmitter then removes the error correction information from the recovered data and corrects the resultant data, if necessary. The program specific tagging data generated at the uplink for controlling access to programs at the subscriber's local terminals is maintained in the data stream. In the illustrated embodiment, the tagging information includes service code data unique to each individual program in the system, cryptographic seeds necessary to enable subscriber terminals to decrypt the digital data, cryptographic key specifiers also required for the decryption apparatus, a tag countdown, and a miscellaneous byte that can be used to designate a particular level of audio service (e.g., high quality, medium quality, or voice) currently carried on the program channel. Each channel transmitter includes a QPSK modulator that modulates the corresponding program channel data onto a discrete carrier for cable system distribution. In the illustrated embodiment, the frequency range for the carriers is about 45 MHz to about 130 MHz, in 100 kHz increments. Narrowband 400 kHz audio data channels are spaced at least 600 kHz apart. A conventional signal combiner and filter/amplifier is also provided to combine the digital data from the plurality of channel transmitters into a single data stream for transmission to the subscriber terminals.

A billing system 42 is provided at the headend for generating subscriber bills. Billing system 42 interfaces with addressable controller 44 to specify which programs each subscriber is entitled to receive. Based on this information, addressable controller 44 provides the necessary receiver control data to enable or prohibit particular program reception at individual subscriber terminals. Like addressable controller. 44, billing system 42 is a commercially available component, the operation of which is well known in the art.

In a subscriber's home, a subscriber terminal 14 serves as a receiver for the digital audio data, providing an analog output signal for input to the audio amplifier of the user's existing stereo system. Subscriber terminal 14 tunes to a channel number which is mapped to a specific QPSK carrier frequency and an audio channel format (CD quality stereo, low sampling rate stereo, or monaural voice), for demodulation and recovery of the digital data for the specific channel. Terminal 14 is discussed in greater detail below in connection with FIG. 3. Generally, the terminal includes circuitry for routing the tagging and control data to a microprocessor, decrypts the audio data, and routes the decrypted audio data to a commercially available Dolby ® integrated circuit chip for digital to analog conversion. The output of the terminal is connected directly to the subscriber's audio amplifier. Terminal operating parameters are stored in nonvolatile RAM.

With the above general system description in mind, a specific implementation of the present invention will now be provided. Turning first to the channel formatters 24 provided at the uplink, one channel formatter is present for each high quality audio channel provided in the system. Each channel formatter converts the digital audio output (e.g., at 588 kilobits per second) for a single channel into a composite bit stream (e.g., at 1.04 megabits per second). The composite bit stream includes the audio data in encrypted form, synchronization data, addressable control data provided by the uplink, program specific tagging data, and error correction data.

The channel formatters can be implemented using programmable gate arrays together with a dedicated (e.g., 8 bit) microprocessor. The channel formatter receives a clock signal and processes it for input to a Dolby ® encoder included in program generation subsystem 20. The Dolby ® encoder is a conventional component that digitizes an analog audio signal. Differential transmitters and receivers are provided in the channel formatter to accept the digital audio data from the Dolby ® encoder in a conventional manner.

In the illustrated embodiment, the left and right stereo channels are each sampled at 294 kb/s, to provide the overall audio rate of 588 kb/s. The audio data is then encrypted using known encryption techniques, and rate converted to enable the insertion of additional data. Next, a synchronization (run-in) pattern, the program specific tagging data ("T"), and addressable control data ("C") are inserted. The formatted data, at a rate of 694 kb/s, is augmented with error correction data for an aggregate per channel bit rate of 1.04 Mb/s. This final bit stream is then passed to the multiplexer 26 for inclusion into a high speed bit stream. A timing and control circuit in the channel formatter provides the necessary clocks and control signals to provide the formatted, error corrected data at the 1.04 Mb/s bit rate. The channel formatter microprocessor generates the program specific tagging data in response to firmware contained in the microprocessor and/or inputs received from a system computer in a conventional manner. Inputs are provided for the encryption key, key specifier, encryption enable, audio format (high quality, medium quality, or voice quality), and service code data.

Multiplexer 26 combines the output of a plurality (e.g., fourteen) of channel formatters into a single high speed digital bit stream at 14.6 Mb/s. Satellite modulator 28 provides a primary uplink encoder clock at 14.6 MHz via emitter coupled logic ("ECL") to transistor transistor logic ("TTL") drivers. Clock generation circuitry provided in multiplexer 26 derives additional clocks from this base frequency, phase locks a local 7.6 MHz oscillator to this frequency, and sends the derived clocks to the channel formatters. A channel formatter synchronization pulse is also created to enable the channel formatters to generate their run-in patterns simultaneously.

The separate channel formatter output bit streams are combined by multiplexer 26 using well known time division multiplexing techniques. This process converts the parallel bit streams into the high speed serial stream (14.6 Mb/s=14*1.04 Mb/s). The high speed bit stream and the synchronization pulse from the clock generation logic are used to overwrite the run-in codes from the channel formatters with a satellite run-in code that is detected and used by the satellite receiving circuitry at the headend. The satellite run-in code is generated and inserted by header generation logic provided in the multiplexer. The final high speed stream is then converted to ECL levels, and output to satellite modulator 28.

As noted above, satellite modulator 28 includes a clock generation circuit to provide the 14.6 MHz clock to the uplink encoder. This clock and the uplink encoder's high speed bit streams are inputs to a differential encoder, that converts the actual data to a bit stream containing information about the data transitions. This is required since the carrier recovery circuit used in the demodulator of satellite receiver 32 introduces phase ambiguity. The differentially encoded data provides an "I" (in-phase) QPSK component and a "Q" (quadrature phase) component. The differentially encoded I and Q streams are preemphasized by premodulation low pass filters, in a conventional manner, to contain the spectrum of normal random data (the audio data is encrypted, hence pseudorandom). This optimizes the energy of the transmitted signal. Next, a 70 MHz carrier is QAM modulated by the I and Q signals, amplified, "sin x/x" equalized by a postmodulation bandpass filter, amplified again, and low pass filtered for harmonic suppression for transmission by the uplink satellite transmission equipment 30.

At the headend, the received satellite signal is processed for local cable system distribution. Specifically, satellite receiver 32 amplifies and downconverts the satellite signal to a 70 MHz IF signal. This signal is low pass filtered, amplified and processed by an automatic gain control section in a conventional manner. The AGC maintains a constant signal amplitude to allow optimal operation of the QPSK demodulator contained in transcoder 34.

Transcoder 34 receives the composite 70 MHz IF signal from the satellite receiver, selects and processes each audio channel individually, and transmits each on a discrete QPSK modulated carrier. The QPSK demodulator 36 converts the 70 MHz signal from the satellite receiver back into two parallel high speed (14.6 MHz) bit streams. These bit streams are identical to the output of the uplink encoder. A data sampling clock for the bit streams is also recovered from the 70 MHz signal. A phase quadrupling carrier recovery circuit is used to provide demodulation. A phase-locked loop locks onto the carrier frequency. A four-phase ambiguity results, since a transmitted reference phase is not available. Thus, the dibit at the modulator input could be recovered as any of the four possible dibits at the demodulator output; however, only the correct dibit will lead to proper data recovery. To resolve this problem, differential encoding/decoding is used. This coding manipulates the dibits so that only changes in the phase of the QPSK signal, and not the absolute phase, represent the transmitted information. Thus, no reference phase is needed. Although the recovered phase information may not match the transmitted phase information, after differential decoding the recovered data will be identical to the transmitted data.

Prior to demodulation, the 70 MHz input is amplified and bandpass filtered at 70±8 MHz. An automatic gain control amplifier provides a constant amplitude signal. The output of the AGC amplifier and a buffered 70 MHz local oscillator are input to a QAM detector that multiplies the signal by the local oscillator to create the I component of the differential signal. A second multiplier receives a 90 degree phase shifted carrier to create the Q component of the differential signal. After low pass filtering, the detected I and Q signals are amplified, summed and cross-multiplied to produce a signal proportional to four times the phase difference between the input carrier and the recovered carrier. This signal is fed back to phase-lock the local oscillator, providing a conventional Costas loop carrier recovery circuit.

The detected I and Q components are also processed by a data and clock recovery circuit such as that disclosed in commonly assigned, copending U.S. patent application Ser. No. 07/688,966 filed on Apr. 19, 1991 and entitled "Apparatus and Method for Recovery of Multiphase Modulated Data". Briefly, the data and clock recovery circuit generates a stable clock that is used to sample the detected data. A voltage controlled crystal oscillator and another phase-lock loop are used to provide the data sampling clock. The sampled data is then converted into a digital signal. The recovered data is still differentially encoded, and decoding is provided to recover the actual multiplexed audio channel data streams. Because of the carrier recovery circuit used, relatively simple (exclusive-OR) differential decoding is possible. The decoder also removes a time offset used in the modulator.

Because of the possibility of spectrum inversion in the two down conversion stages, it is possible to demodulate and recover data that is inverted. Since the uplink multiplexer inserts a known run-in pattern, this condition may be detected by logic at the differential decoder output. The logic will invert the clock polarity used to decode the data, thereby correcting the error condition.

Figure 2:
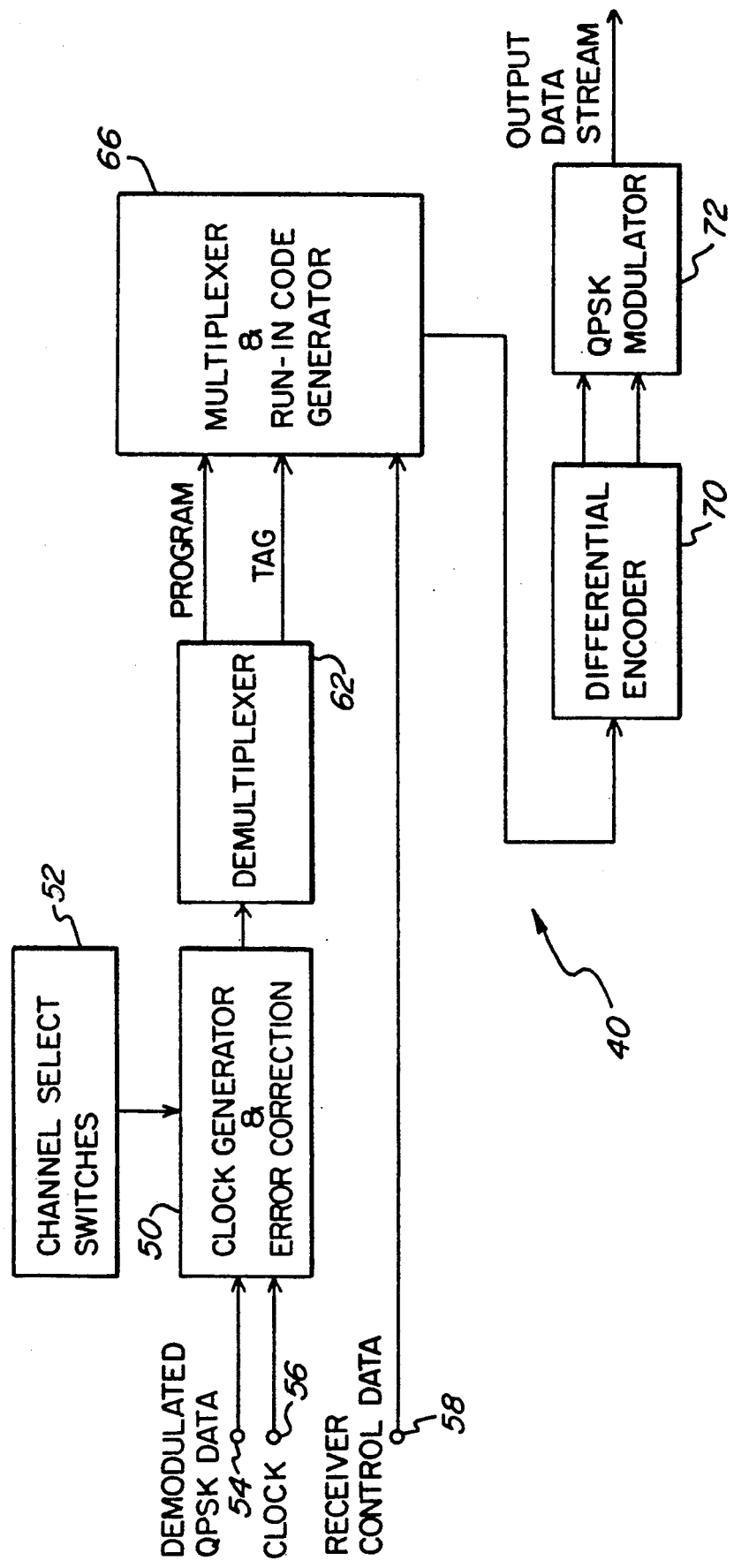
FIG. 2 is a detailed block diagram of a channel transmitter used at the headend of the system illustrated in FIG. 1.

Microcontroller 38 searches for the run-in code in the demodulated high speed bit streams output from QPSK demodulator 36. The microcontroller also provides synchronization information to all of the channel transmitters 40 (one shown) in the transcoder and receives local data from addressable controller 44 for embedded data stream insertion. The local data includes nonprogram specific receiver control data, broadcast data, and optional spare data. A detailed block diagram of a channel transmitter 40 is illustrated in FIG. 2.

The channel transmitter includes a clock generator and error correction circuit 50 that receives the demodulated QPSK data from demodulator 36 at a terminal 54. The 14.6 MHz clock signal recovered by demodulator 36 is input at terminal 56. Additional clock signals are derived from these clock and data signals, synchronization pulses from microcontroller 38, and channel select switches 52 that choose one of the channel formatter bit streams received from the satellite uplink. Clock generator and error correction circuit 50 uses the clock signals in performing a standard error correction routine on the demodulated QPSK data at the channel's 1.04 Mb/s bit rate. After the error correction data has been used and discarded, the recovered formatted data, at 694 kb/s, is output to a demultiplexer 62 for retrieving the program data and tag data.

Receiver control data from addressable controller 44 is input via a terminal 58 from microcontroller 38 (FIG. 1). A multiplexer and run-in code generator 66 receives the receiver control data, the recovered program data, and the recovered tag data. It can also receive any broadcast and/or spare data streams (not shown) output from microcontroller 38 or provided by other components of the system. Multiplexer and run-in code generator 66 generates a run-in code for the subscriber terminals, and multiplexes the run-in code, program data, tag data, receiver control data, and any additional data in accordance with the present invention to provide a composite data stream for encoding at differential encoder 70. It should be understood that the multiplexing operation may involve merely overwriting data contained in the data stream received at the headend with the new run-in code and receiver control data. Differential encoder 70 differentially encodes the individual channel data stream to aid in the data recovery process in the subscriber terminal.

The parallel outputs from differential encoder 70, comprising the I and Q QPSK components, are modulated in a QPSK modulator 72 onto an RF signal carrier to provide the RF output signal for one channel of audio data. The modulated carrier has a frequency within the cable television band, i.e., from about 45 MHz to about 130 MHz. The single channels output from each of the channel transmitters 40 are combined and the aggregate signal amplified by an RF combiner/amplifier to provide a single RF output signal from the transcoder 34.

The subscriber terminal for receiving the combined RF program channel signals is illustrated in FIG. 3. The signals are input at a terminal 80, and passed to a tuner 82 to select a particular channel for recovery of the selected audio program. Tuner 82 is preferably a phase-locked loop ("PLL") control tuner, having a frequency range over the desired cable television spectrum of about 45 MHz to 130 MHz. Such tuners are well known in the art. An automatic gain control circuit 86 is provided to allow data recovery down to an input level of −30 dBmV. Local oscillator ("LO"), IF filter/limiter circuitry 84 operates in a conventional manner to downconvert the tuned signal to an appropriate intermediate frequency for QPSK data demodulation. An automatic fine tuning circuit ("AFT") 92 is provided in a PLL arrangement to maintain the proper IF for data demodulation.

Demodulation is provided by a data demodulation and recovery processor 90. Filtering of the QPSK phase components is provided by I and Q filtering circuit 88 coupled to data demodulation and recovery processor 90. An example of a data demodulator that can be used in connection with the present invention is disclosed in commonly assigned, copending U.S. patent application Ser. No. 07/714,882, entitled "Data Referenced Demodulation of Multiphase Modulated Data" filed concurrently herewith.

A microprocessor 100 controls the overall operation of subscriber terminal 14. For user interaction, it reads both the front panel keys provided on a keyboard 102 and an IR receiver 104 that receives user selections from a remote control. A channel indicator display 106 is provided to indicate the number of the program channel that is currently tuned. Terminal operating parameters downloaded from headend addressable controller 44 (FIG. 1) are stored in a nonvolatile RAM 108. Microprocessor 100 interfaces with the tuner section of the terminal to select the tuned frequency. The microprocessor also interfaces with a volume control 110 to control the output signal level. In addition, the microprocessor interfaces with data demodulation and recovery processor 90 to detect a run-in pattern in the received data, to recover and interpret the in-band tagging and control data streams, to load the audio decryption information, and to control the audio processing mode (high quality, medium quality, or voice monaural). The format of the audio data, which depends on the audio mode, is identified by the program specific tag data.

Data demodulation and recovery processor 90 interfaces with the tuner section, the microprocessor, and a Dolby ® decoder circuit 98. In operation, data demodulation and recovery processor 90 provides the reference frequency for the tuner, demodulates the received QPSK signal, and assists in controlling the AFT loop. This processor also contains logic to detect the run-in pattern in the demodulated data, to extract the embedded receiver control and tag data streams, to decrypt the digital audio data, and to select the proper audio data for the Dolby ® decoder circuit 98 in each of the different audio modes.

Decoder 98 is a conventional Dolby ® adaptive delta demodulation decoder that is commercially available. This circuit converts the digital data to an analog signal suitable for input to the volume control circuitry 110 which regulates the signal amplitude in response to control signals from microprocessor 100. The output of volume control 110 is provided to audio output terminals 112, 114 for input to a subscriber's audio amplifier.

Two voltage controlled crystal oscillators 94, 96 are provided in the subscriber terminal 14. One, operating at 7.633334 MHz is the master clock oscillator. The other, running at 24.98 MHz is used to sample the digital data output from LO, IF filter/limiter 84.

In accordance with the present invention, the data stream containing the audio data, receiver control data, and tag data is provided in a unique format. The format will be described below in connection with FIGS. 4 through 8. The bit stream structure illustrated in these figures applies to each individual channel in the system. The demodulated, baseband digital data format is described.

The bit stream transmitted from headend 12 to subscriber terminal 14 appears as a continuous sequence of "units" 120. Each unit consists of a predefined number of bits. In the illustrated embodiment, 520 bit units are described. Each unit consists of a data header ("H") 122 followed by ten data groups ("G") 124 as shown in FIG. 4. The 20 bit data header 122 is further divided into four fields 126, 128, 130, 132 as illustrated in FIG. 5. The components of the header are as follows:

R—"run-in", allows for receiver synchronization. It consists of fourteen "1" bits.

F—"framing", also used in receiver synchronization. It consists of four "0" bits. Data demodulation and recovery processor 90 searches for the run-in and framing pattern to become synchronized with the incoming bit stream. The run-in and framing portions of the unit are generated by logic on the channel transmitter 40 at the headend for the particular program channel.

T—"tag data", provides program specific information to the terminal. A single bit of such information is provided for each 520 bit unit. Consecutive tag bits from consecutive units appear as an asynchronous, serial data stream.

X—"spare data", provides an auxiliary data stream of one bit per unit at the same rate as the tag data T. Use of the spare data is optional.

Each individual data group 124 consists of fifty bits, and is arranged as shown in either FIG. 6, FIG. 7, or FIG. 8. Data group 124a of FIG. 6 illustrates a normal high quality stereo group format. Data group 124b illustrated in FIG. 7 illustrates a medium quality low sampling rate ("LSR") group format. This format accommodates two LSR channels, which are sampled at half the rate as the high quality normal stereo data depicted in the format of FIG. 6. Data group 124c illustrated in FIG. 8 provides a format accommodating four voice grade channels. A voice monaural channel is equivalent to either a left or right channel of an LSR stereo channel. In the three different formats 124a, 124b, and 124c, only the audio data portions differ. The control and broadcast data stream bits are identical.

Control data ("C") 160 consists of a single bit per group. This bit defines a synchronous, serial data stream used to address and control the subscriber terminals in the system. The broadcast data ("B") 162 provides an auxiliary data stream consisting of a single bit per group at the same rate as the control data 160. Use of the broadcast data stream is optional.

In addition to the control and broadcast data, each data group 124 contains the audio program data. In the normal stereo group format illustrated in FIG. 6, the audio data comprises 44 bits of Dolby ® encoded audio data. The data alternates between 22 bits of left channel (L1 ... L22) and right channel (R1 ... R22) information. Step data ("SL, SR") consists of one bit per channel (left and right) of step data for the Dolby ® delta modulation scheme. Emphasis data ("EL, ER") consists of one bit per channel (left and right) of emphasis data for the Dolby ® delta modulation scheme. All of the Dolby ® audio, step and emphasis data is provided by conventional Dolby ® processing circuitry.

The basis of all timing measurements in the subscriber terminal is the system master clock frequency $f_0$, which in the illustrated embodiment is 7.633334 MHz. In accordance with the present invention, all data rates in the subscriber terminal are related to this fundamental frequency. In the illustrated embodiment, the data rate calculations are as follows, wherein n signifies the total number of bits in a unit, i.e., 520:

$f_D$, the audio rate (left and right) = $f_0/13/2$ = 294 kbit/s $f_V$, the voice audio rate (per channel) = $f_D/2$ = 147 kbit/s $f_{SL} = f_{SR}$, the step rate = $f_D/22$ = 13.3 kbit/s $f_{EL} = f_{ER}$, the emphasis rate = $f_D/22$ = 13.3 kbit/s $f_{SE}$, the voice step/emphasis rate = $f_D/2$ = 6.67 kbit/s $f_C$, the control data stream rate = $f_D/22$ = 13.3 kbit/s $f_B$, the broadcast data stream rate = $f_D/22$ = 13.3 bit/s $f_T$, the tag data stream rate = $f_C/10$ = 1.33 kbit/s $f_X$, the spare data stream rate = $f/_C10$ = 1.33 kbit/s $f_{bit}$, the individual bit rate = $f/_C10$ = 1.33 kbit/s f, the aggregate data rate = $nf_{bit}$ = 694 kbit/s $f_0/f$, the number of clock cycles per bit = 11 t, an individual bit time = $1/f$ = 1.44 μs $t_U$, the unit time = $1/f_{bit}$ = 520 t = 749 μs $t_R$, the run-in/framing time = 18 t = 25.9 μs The run-in/framing overhead percentage = $t_R/t_U$ = 3.46%

As can be seen from the above, the audio program data is sampled at a first rate $f_D$ that is a function of the master clock frequency $f_0$. A first category of control data, namely the receiver control data is sampled at a second rate $f_C$ that is a function of the first sampling rate $f_D$. A second category of control data, namely the tag data, is sampled at a third rate $f_T$ that is a function of the second sampling rate $f_C$. In the illustrated embodiment, first rate $f_D$ is an integer factor of the clock rate $f_0$, the second rate $f_C$ is an integer factor of the first rate $f_0$, and the third rate $f_T$ is an integer factor of the second rate $f_C$.

Each of the tag (T) and spare (X) embedded data streams is an asynchronous serial bit stream, with configurable communication parameters (bits/word, stop bits, and parity). In the standard asynchronous format, the bit order in the serial stream is start bit (0), data bits (least significant (D0) first), odd parity bit, stop bit (1), optional idle (1) bits. As indicated above, one tag bit is transmitted per unit.

The control data stream (C) and the optional broadcast data stream (B) are synchronous. One byte is transmitted for every ten bits (one byte/unit). The format of a control byte within a unit is as follows:

Control data stream byte D12345678P where
D is the C bit in group 1 of the unit
1 is the C bit in group 2 of the unit
2 is the C bit in group 3 of the unit
..
..
..
8 is the C bit in group 9 of the unit
P is the C bit in group 10 of the unit and
D = data available bit (if D = 1, byte is valid)
1 = least significant bit of 8-bit byte (D0)
8 = most significant bit of 8-bit byte (D7)
P = parity bit of byte (odd parity)
(total number of "1" bits in the 10 bit set is odd)

In addition to the run-in and framing portions of the unit, the parity bit (P) of the synchronously transmitted bytes may be used for error detection in the subscriber terminal. (Some type of filtering must be used to determine when a bad headend-terminal link exists.) Thus, even when the data available bit (D) is zero (data not available), the parity bit must be correct.

The receiver control data stream (C) is used to provide addressable control to terminals in the system. This data stream is common to each tunable channel in a system. Functions of the receiver control data stream will depend upon the particular system implementation. In general, such data can comprise commands to reset a terminal, connect or disconnect a terminal, authorize a terminal to receive a particular program channel, force tune the terminal to a specified frequency, correlate the tuned frequency to a displayed channel number via a frequency map, set cryptographic keys for use in decrypting digital data received by the terminal, initialize a terminal, provide date and time information to the terminal, establish the terminal's address, initialize a terminal time out counter, identify the system in which a terminal is resident, and control various terminal features.

The tag data stream (T) is used to provide channel specific information to terminals in the system. Each tunable channel in a system has a unique tag data stream associated with it. As indicated above, the tag data is contained as a single bit in each header. The tag data can comprise, for example, a command identifying a program's service codes, the audio encryption seed, the encryption/key specifier, and a tag countdown value all for use in authorizing a terminal to receive a particular program which the subscriber is entitled to receive. A miscellaneous data byte transmitted with the tag data can be used to identify the audio mode (high quality, medium quality, monaural voice) of a particular program, and hence the group data format of the received data.

It should now be appreciated that the present invention provides a system for transmitting audio program data, tag data, and receiver control data in a single data stream by providing a unique data format. In the data format, a tag data stream is provided by transmitting a single bit of tag information in a header for each "unit"

comprising a header and ten data groups. A receiver control data stream is provided by including one control data bit in each of the ten groups contained in a unit. Each group also includes 44 bits of high quality digital audio information, or an equivalent number of bits of lower quality audio data. Therefore, for each unit in a composite data stream, one bit of tag data is provided, ten bits of control data are provided, and 440 bits of audio data are provided. Provision is also made in a 520 bit unit for 40 step data and emphasis data bits required to decode the audio data, ten optional broadcast bits (B), one spare bit (X), and 18 run-in and framing bits. In both the system transmitter and receiver, a single master clock running at a rate that provides an integer number of cycles per bit of data can be provided for sampling the program data, control data, and tagging data. The program data is sampled as a function of the master clock, the control data is sampled at a rate that is a function of the program data sampling rate, and the tag data is sampled at a rate that is a function of the control data sampling rate.

Although the invention has been described in connection with a specific embodiment, those skilled in the art will appreciate that numerous adaptations and modifications may be made thereto without departing from the spirit and scope of the invention as set forth in the claims.

What is claimed is:

1. A method for transmitting different categories of data in a single data stream comprising the steps of:
    generating program data for insertion into a data stream;
    generating a first category of control data for insertion into said data stream;
    generating a second category of control data for insertion into said data stream;
    combining a set of said program data with a set of said first category of control data to form a data group;
    generating a header containing data from said second category of control data;
    combining said header with a plurality of said data groups to form a unit; and
    constructing said data stream by joining a plurality of successive units for transmission.

2. A method in accordance with claim 1 wherein said second category of control data comprises program specific tag data.

3. A method in accordance with claim 2 wherein said first category of control data comprises non-program specific receiver control data.

4. A method in accordance with claim 3 wherein said tag data identifies the format of the data in said groups.

5. A method in accordance with claim 1 comprising the further steps of:
    providing a master clock having a fixed frequency;
    sampling said program data for incorporation into said data stream at a first rate that is a function of said master clock frequency;
    sampling said first category of control data for incorporation into said data stream at a second rate that is a function of said first sampling rate; and
    sampling said second category of control data for incorporation into said data stream at a third rate that is a function of said second sampling rate.

6. A method in accordance with claim 5 wherein:
    said master clock frequency has an integer number of cycles per bit of data in said data stream;
    said first rate is an integer factor of said master clock frequency;
    said second rate is an integer factor of said first rate; and
    said third rate is an integer factor of said second rate.

7. A method in accordance with claim 6 wherein said second category of control data comprises tag data that is specific to a particular program in said data stream.

8. A method in accordance with claim 7 wherein said tag data identifies the format of the data in said groups.

9. Apparatus for communicating different categories of digital data to a receiver comprising:
    first means for generating a first category of control data for insertion into a data stream;
    second means for generating a second category of control data for insertion into said data stream;
    third means for generating program data for insertion into said data stream;
    means operatively associated with said first and third means for combining a set of said program data with a set of said first category of control data to form a data group;
    means operatively associated with said second means for generating a header containing data from said second category of control data;
    means for combining said header with a plurality of said data groups to form a unit; and
    means for constructing said data stream by joining a plurality of successive units for transmission.

10. Apparatus in accordance with claim 9 wherein said second means generate program specific tag data.

11. Apparatus in accordance with claim 10 wherein said first means generate non-program specific receiver control data.

12. Apparatus in accordance with claim 10 wherein said tag data identifies the format of the data in said groups.

13. Apparatus in accordance with claim 9 further comprising a master clock having a fixed frequency, wherein:
    said program data is sampled at a first rate that is a function of said master clock frequency for incorporation into said data stream;
    said first category of control data is sampled at a second rate that is a function of said first sampling rate for incorporation into said data stream; and
    said second category of control data is sampled at a third rate that is a function of said second sampling rate for incorporation into said data stream.

14. Apparatus in accordance with claim 13 wherein:
    said master clock frequency has an integer number of cycles per bit of data in said data stream;
    said first rate is an integer factor of said master clock frequency;
    said second rate is an integer factor of said first rate; and
    said third rate is an integer factor of said second rate.

15. Apparatus in accordance with claim 14 wherein said second means provide tag data that is specific to a particular program in said data stream.

16. Apparatus in accordance with claim 15 wherein said tag data identifies the format of the data in said groups.

17. A receiver for receiving the data stream from the apparatus of claim 9, said receiver comprising:
    means for detecting the first and second categories of control data from the received data stream;

means responsive to detected control data for recovering program data from the received data stream; and means for reproducing a program from the recovered program data.

18. A receiver in accordance with claim 17 further comprising a master clock having a fixed frequency, wherein:

said recovering means sample said program data at a first rate that is a function of said master clock frequency;

said detecting means sample said first category of control data at a second rate that is a function of said first sampling rate; and said detecting means sample said second category of control data at a third rate that is a function of said second sampling rate.

19. A receiver in accordance with claim 18 wherein:

said master clock frequency has an integer number of cycles per bit of data in said data stream;

said first rate is an integer factor of said master clock fixed frequency;

said second rate is an integer factor of said first rate; and said third rate is an integer factor of said second rate.

20. A receiver in accordance with claim 17 wherein said program data is digital audio data used to reproduce an audio program.

21. A digital data receiver for receiving a data stream containing successive headers including tag data, with each header followed by a plurality of data groups including program data and receiver control data, said receiver comprising:

first means for detecting receiver control data from successive data groups contained in a received data stream;

second means for detecting tag data from successive headers contained in the received data stream;

means responsive to the detected tag and receiver control data for recovering program data from the received data stream; and means for reproducing a program from the recovered program data.

22. A data receiver in accordance with claim 21 further comprising a master clock having a fixed frequency, wherein:

said recovering means sample said program data at a first rate that is a function of said master clock frequency;

said first detecting means sample said receiver control data at a second rate that is a function of said first sampling rate; and said second detecting means sample said tag data at a third rate that is a function of said second sampling rate.

23. A data receiver in accordance with claim 22 wherein:

said first rate is an integer factor of said master clock fixed frequency;

said second rate is an integer factor of said first rate; and said third rate is an integer factor of said second rate.

24. A data receiver in accordance with claim 23 wherein said program data is digital audio data used to reproduce an audio program.

25. A data receiver in accordance with claim 24 wherein said master clock runs at a rate that provides an integer number of cycles per bit of data in said data stream.

26. A data receiver in accordance with claim 21 further comprising:

means for tuning to different channels to receive different data streams having data groups that may be provided in different formats;

wherein said tag data contains information identifying the data group format for a particular channel for use by said program data recovering means in recovering program data from that channel.

* * * * *